Feb. 14, 1967    R. H. FARQUHAR    3,303,582
TERRESTRIAL-CELESTIAL DISPLAY APPARATUS
Filed Aug. 11, 1964    6 Sheets-Sheet 1
FIG_1_
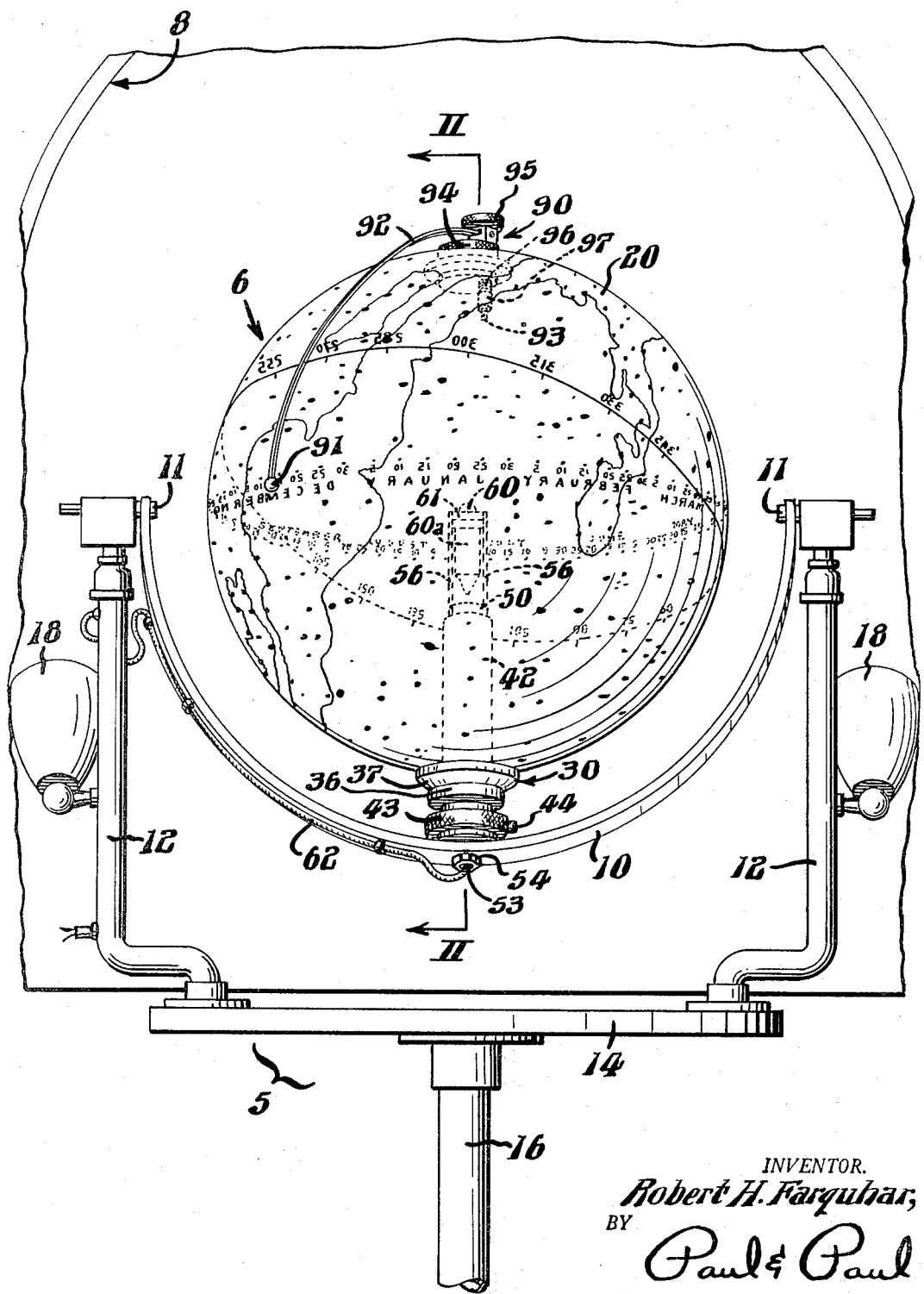
INVENTOR.
Robert H. Farquhar,
BY
Paul & Paul
ATTORNEYS.

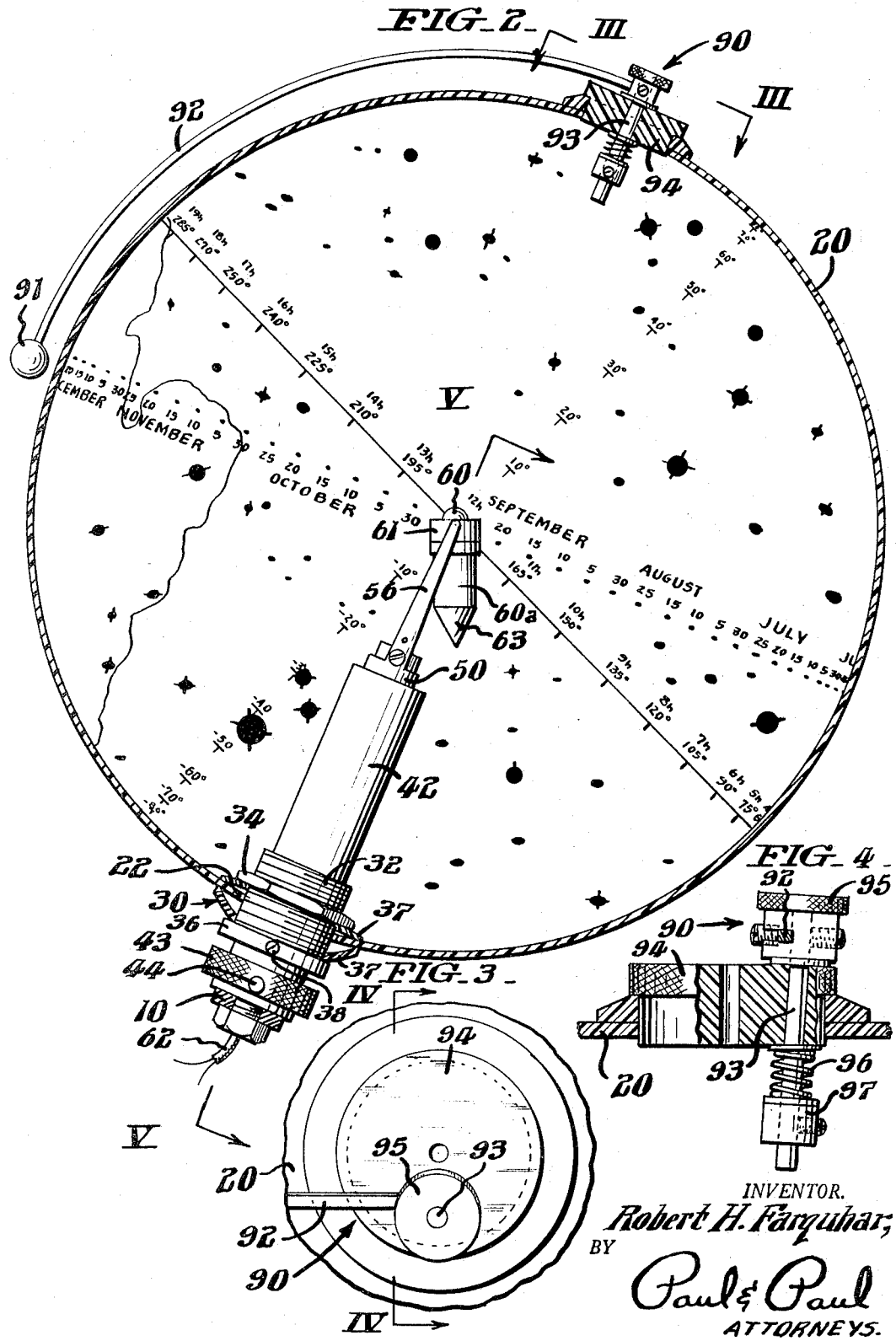

Feb. 14, 1967  R. H. FARQUHAR  3,303,582
TERRESTRIAL-CELESTIAL DISPLAY APPARATUS
Filed Aug. 11, 1964  6 Sheets-Sheet 3
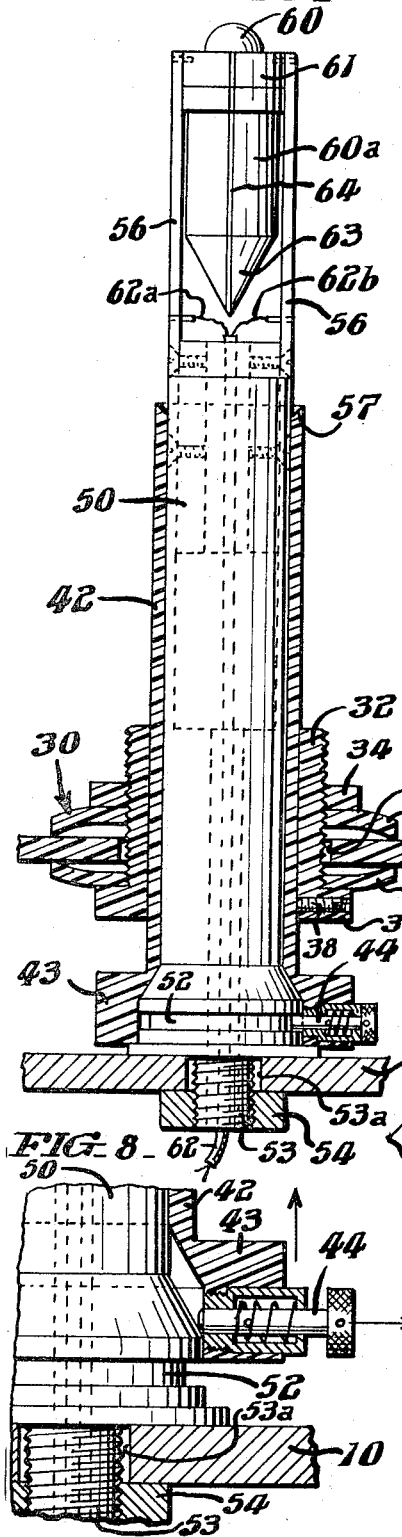
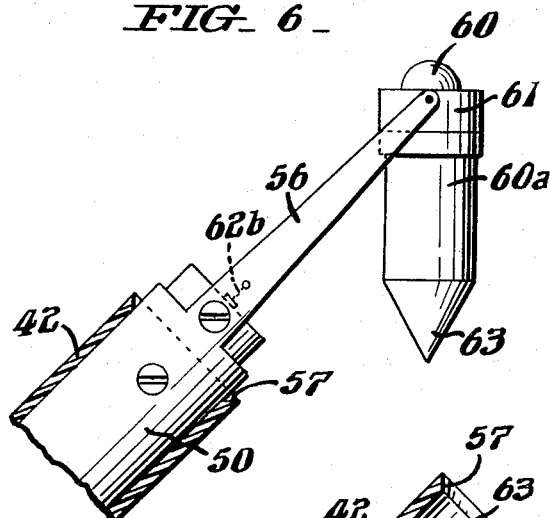
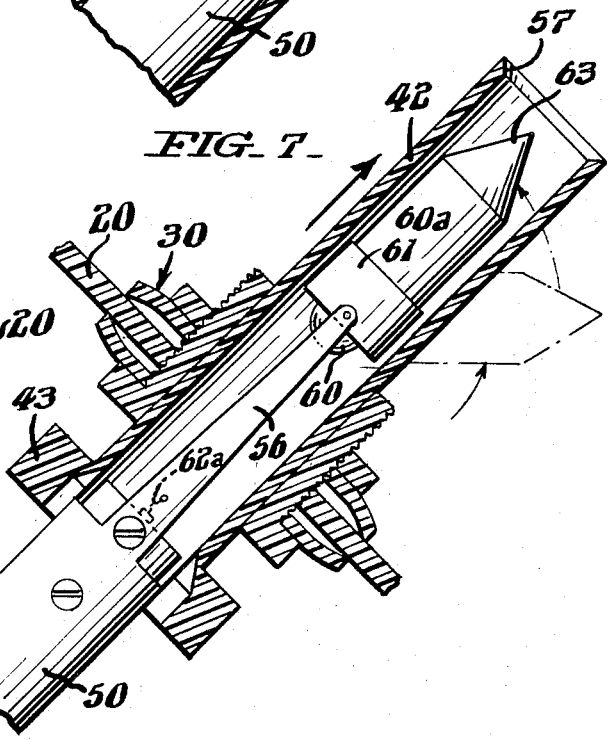
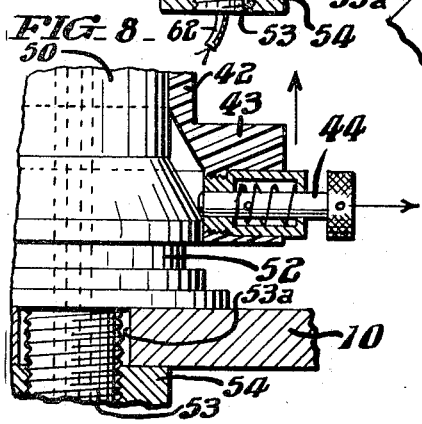
INVENTOR.
*Robert H. Farquhar*,
BY
*Paul & Paul*
ATTORNEYS.

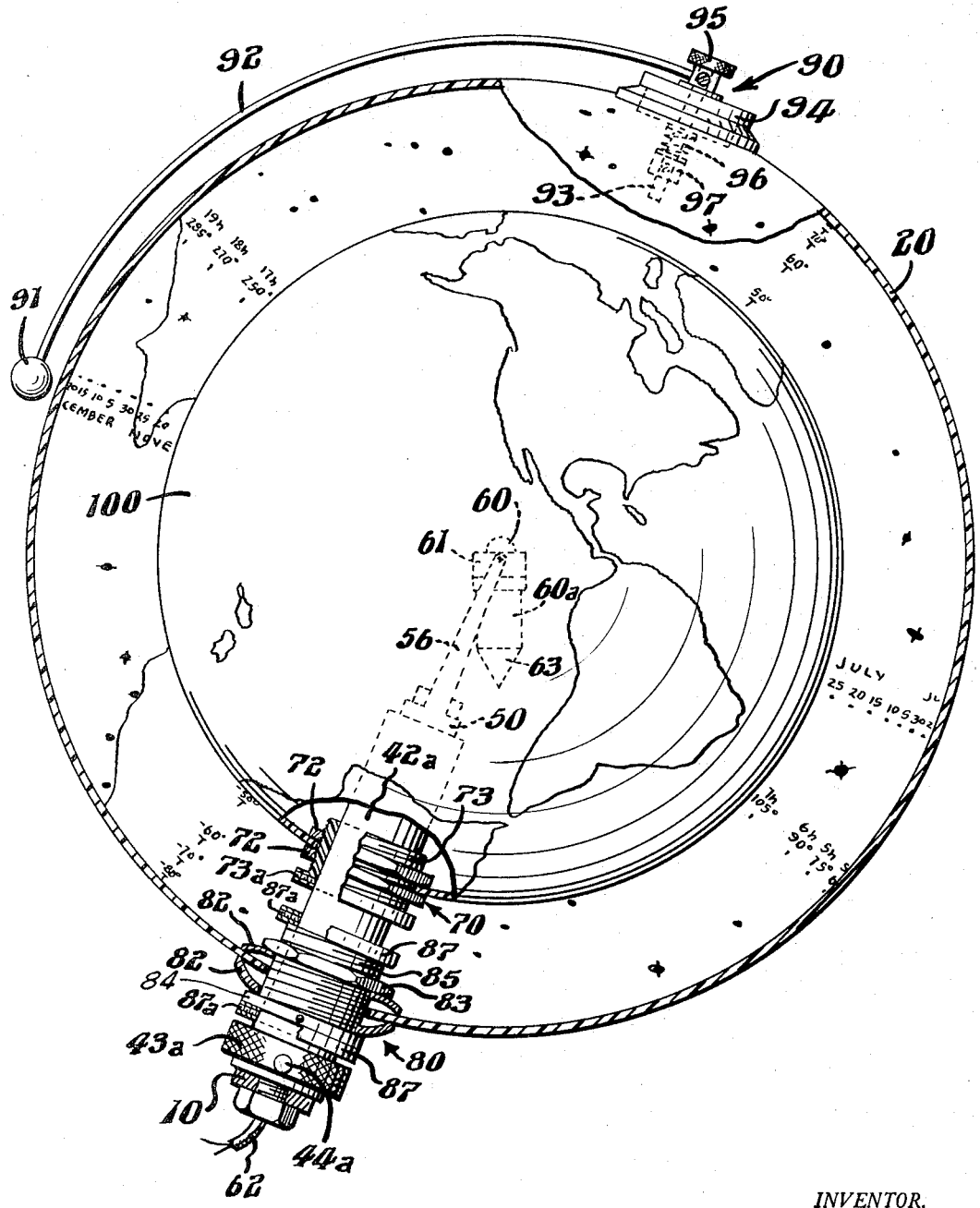

Feb. 14, 1967 R. H. FARQUHAR 3,303,582
TERRESTRIAL-CELESTIAL DISPLAY APPARATUS
Filed Aug. 11, 1964 6 Sheets-Sheet 5
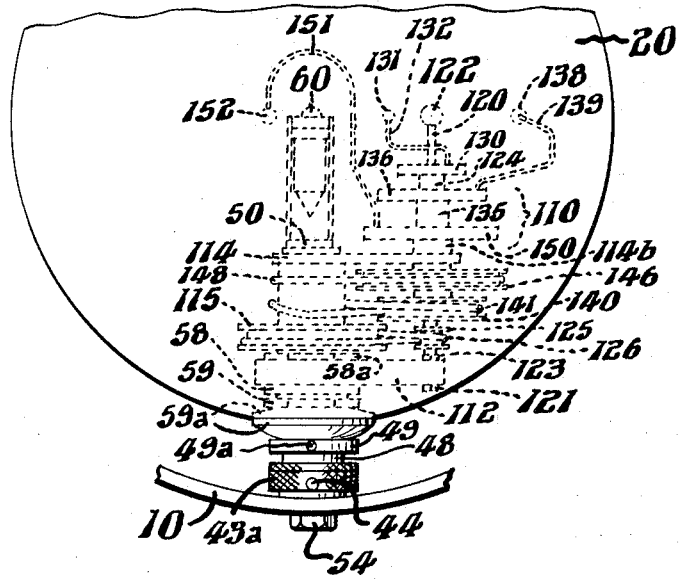
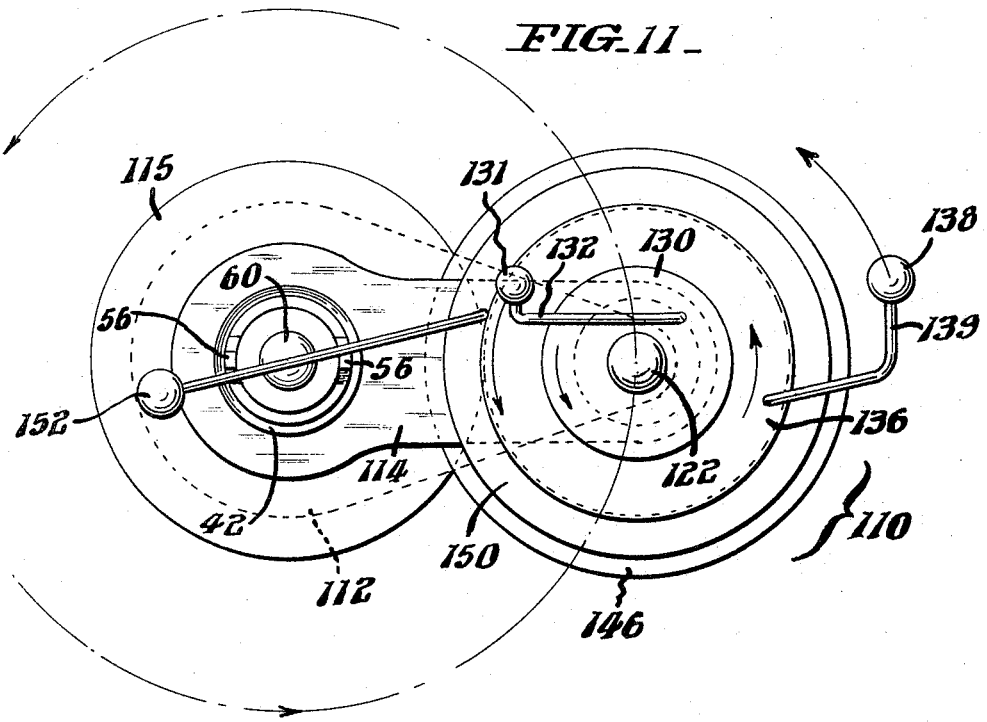
INVENTOR.
Robert H. Farquhar,
BY
Paul & Paul
ATTORNEYS.

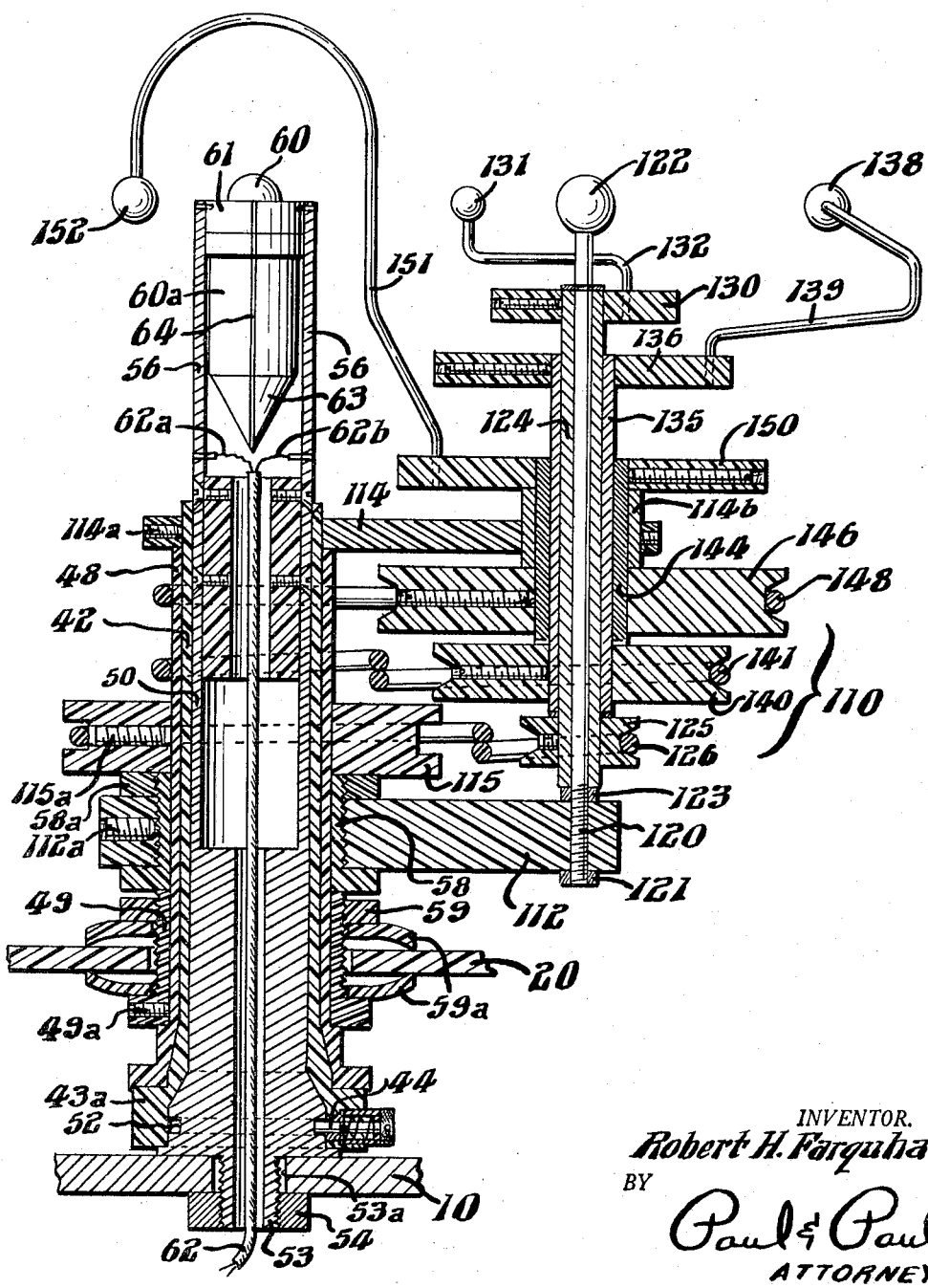

United States Patent Office 3,303,582
Patented Feb. 14, 1967

3,303,582
TERRESTRIAL-CELESTIAL DISPLAY APPARATUS
Robert H. Farquhar, 423 St. Davids Road,
St. Davids, Pa. 19087
Filed Aug. 11, 1964, Ser. No. 388,865
4 Claims. (Cl. 35—47)

This invention relates to a terrestrial and celestial display apparatus and, more particularly, to apparatus for displaying and projecting selected information concerning celestial bodies and the Earth on a viewing surface.

The apparatus of this invention is known commercially as the Farquhar "Space Laboratory" and essentially includes a projecting unit which accepts any one of a number of transparent globes having preselected celestial or terrestrial information printed thereon for display or for projection upon a separate, preferably dome shaped viewing surface. The display and projecting unit includes certain attachments and accessories for the purposes described hereinbelow.

It is the primary object of this invention to provide apparatus affording an entirely new classroom projection and display concept of the Earth and surrounding space. The apparatus of this invention finds particular advantage and utilization by supplying answers to familiar questions pertaining to celestial bodies alone and to the basic terrestrial-celestial relationships. The apparatus of this invention is invaluable as a classroom device for acquainting the student with the Earth beneath him, the sky above him, and the universe around him. The apparatus teaches a student a new directional relationship with the universe in a manner heretofore only thought of in terms of compass directions on the Earth's surface.

Therefore, it is an object of this invention to provide an apparatus which may be used as a static display to teach the aforementioned objectives or may be used to project the selected information on, preferably, a dome like viewing surface mounted above the projection unit.

It is another object of this invention that the projection unit be adapted to accommodate any one of a series of selected globes having information thereon including supporting means adapted to demonstrate movement of the Earth and stars.

It is another object of this invention that the above described apparatus have the capacity to project or display a combination of terrestrial and celestial information superimposed on each other, thereby teaching relationships of position not within the capability of prior art devices.

And, finally, it is an object of this invention that the apparatus having the above described advantages be versatile, extremely easy to operate and ideally suited for teaching space age concepts in schools or the like where cost and size limitations would be otherwise prohibited.

The above outlined objects and advantages of this invention will become more apparent from the written description set forth hereinbelow and from the drawings wherein:

FIGURE 1 is a view in side elevation of the preferred form of the basic projection unit and display stand of this invention incompletely shown including a star globe mounted in operable position thereon;

FIGURE 2 is an enlarged partial sectional view generally taken along the lines and arrows II—II of FIGURE 1 showing the star globe and mounting apparatus in greater detail;

FIGURE 3 is a partial plan view taken from the top of the globe as indicated by the lines and arrows III—III of FIGURE 2 showing one form of the moon guide apparatus;

FIGURE 4 is a sectional view taken along the lines and arrows IV—IV of the apparatus shown in FIGURE 3;

FIGURE 5 is a view partly in section and partly in elevation taken along the lines and arrows V—V of FIGURE 2 showing one form of the globe supporting stem of this invention;

FIGURE 6 is a partial side elevational view of the globe supporting stem and projecting light;

FIGURE 7 is a partial side elevational view of the stem and light shown in FIGURE 6 with the surrounding globe clamping means shown in section;

FIGURE 8 is a partial view in side elevation and in section of the clamping mechanism of the globe and supporting shaft shown in FIGURE 5;

FIGURE 9 is a side elevation view, partly in section, of a pair of concentric globes and one form of the supporting apparatus;

FIGURE 10 is a partial side elevational view of the globe having one form of a planet display apparatus mounted therein as indicated in broken lines;

FIGURE 11 is a plan view of the planet display apparatus of FIGURE 10; and

FIGURE 12 is a vertical sectional view of the planet display apparatus otherwise shown in FIGURES 10 and 11.

The following description is directed to the specific form of the invention illustrated in the drawings and is not intended to limit the scope of the invention itself which may be practiced in a wide variety of forms and arrangements.

The preferred form of the display and projection apparatus of this invention known as the Farquhar "Space Laboratory," as shown in FIGURE 1, comprises a projection unit and supporting stand, generally designated by the numeral 5, a number of transparent celestial or terrestrial globes generally designated by the numeral 6, which are detachably mounted on the supporting apparatus, and a separate projecting or viewing surface, preferably dome or hemispherically shaped, generally designated by the numeral 8. When the apparatus is used for display purposes, the stand 5 having globe 6 mounted therein is positioned in such a location that students may walk freely around the stand viewing the information displayed on the globe. When a celestial scene is projected, chairs may be positioned around the stand so that the viewer can see above him the projected image on the hemispherical surface of the dome. Of course, the apparatus of this invention can be used in many other ways for different purposes with modifications and attachments thereto and only a single preferred form of the apparatus and use thereof is described hereinbelow.

The projecting unit 5 is constructed so that any one of a number of globes can readily be mounted on the stand for projecting various celestial scenes. Each globe automatically locks in place on the projector and the supporting stand is designed so that the globe can be rotated around both a horizontal and vertical axes.

In greater detail, the projecting unit and stand 5 includes a movable cradle 10 supported at opposing ends by a pair of studs 11 which are mounted in a pair of substantially vertical arms 12 on platform 14. Platform 14 and the apparatus mounted thereon are vertically adjustable by means of extendible column 16 which in turn is supported at the distal end by a base having lock type casters (not shown) so that the entire unit can be readily moved about.

The projecting unit 5 includes a rheostat controlled, pinpoint projection lamp 60, shown in FIGURE 1 in broken lines and two rheostat controlled dome lamps 18 mounted on the arms 12. The unit is also equipped with a built-in light pointer (not shown).

The transparent star map projection globe 20, shown in FIGURE 1 and in greater detail in FIGURE 2, represents only one of a series of globes having selected celestial or terrestrial information printed thereon. Globe 20 is fixedly attached to a sleeve 42 (shown in broken lines) by a clamping apparatus, generally designated by the numeral 30, said sleeve being mounted on a supporting shaft or stem 50. Shaft 50 is attached to the cradle 10 for movement therewith as further shown in FIGURE 5. Electric current is supplied to the projection lamp 60 by an insulated wire 62 running along the cradle 10 and through one of the vertical supports 12 to a source of power not shown.

The reflecting or viewing dome 8 which is only partially shown in FIGURE 1 is preferably formed in the shape of a hemisphere and supported by a series of vertically arranged legs (not shown) around its lower annular edge. The dome 8 may be formed in sections which can be easily assembled thereby converting an existing classroom into a "Space Laboratory." The exterior dome sections are equipped with a suitable reflecting surface so that the projected information will be suitably clear and enlarged for the viewer.

The transparent star map projection globe 20 and its movable supporting apparatus is shown in greater detail in FIGURE 2. Globe 20 is preferably manufactured from a transparent plastic which may be more easily formed in two hemispheres and joined around the circumferences. The printed information, as described hereinbelow, is placed on the inside surface of the globe so that when projected onto the viewing dome, the words and symbols are legible. The globe can be read by looking through to the far side and, in this manner, corresponds to the arching sky overhead or the planetarium view.

Some of the celestial printed information arranged around the inner surface of globe 20, as partially shown in FIGURE 2, includes the popular names, Greek letter designation and distance away from the Earth in light years for certain of the brighter stars. Also, many double, multiple and variable stars are shown. The globe may project names and boundaries of some of the constellations. The elliptic circle is indicated along with the apparent position of the true sun and mean sun. Also, the processional path of north and south celestial poles is shown. In addition, some well known star clusters, nebulae and galaxies are shown as well as the outline of the Milky Way by a single wavy line. Indications of latitude with the corresponding hour and indications of longitude show the equator and vertical axis of the Earth. It should be apparent that the transparent projecting globe as shown is an ideal medium for displaying selected celestial information.

A moon display device, generally designated by the numeral 90, is mounted on the globe at the north ecliptic pole. The moon apparatus includes a moon simulating phere 91 supported by arm 92 from a rotatable shaft 93 mounted in a movable, supporting plug 94. As shown in FIGURE 3, shaft 93 is eccentric to the center of plug 94 thereby causing the moon sphere 91 to trace a circular path around the globe which crosses the eliptic circle at two points. These points are known as the nodes of the moon. Because the nodes progressively advance during the calendar year, removable plug 94 allows the position of the axis of the moon sphere 91 to be changed at will. As shown in FIGURE 4, shaft 93 is tensioned in plug 94 by spring 96 and collar 97. A knurled positioning nut 95 is attached to shaft 93 to facilitate adjustment of the position of the moon sphere 91.

One form of the globe clamping apparatus 30 and the projection light are shown in greater detail in FIGURES 5–8. Globe support shaft or stem 50 is equipped with a threaded stud 53 at the distal end which extends through a hole 53a in the cradle 10 and is held thereon by locking nut 54. The projection light 60, held at the other or inner end of shaft 50 is mounted in a cavity within a plumb 60a which, in turn, is supported for movement by a pair of oppositely placed prongs 56. The gravity responsive plumb 60a is divided into two electrically conductive parts by insulation 64 thereby allowing electrical current to flow through the wire 62a, through the left prong as shown in FIGURE 5, through bulb 60, and return through the other prong and wire 62b. A flat, annular surface 61 formed at the top of plumb 60a surrounds bulb 60 at the mid-point thereby creating a shadow "horizon" by allowing projection of only a hemisphere of illumination. This construction creates the desired shadow horizon which remains horizontal to the viewers plane of reference irrespective of the angle of inclination of the axis of the globe 20 or shaft 50. As shown in FIGURES 6 and 7, the conical base 63 of the plumb and the beveled annular edge 57 of the sleeve 42 allow the sleeve and attached globe, as described hereinbelow, to be readily placed on and removed around plumb 60a. When the inclination of shaft 50 is such as shown in FIGURES 6 and 7, outward movement of sleeve 42 causes plumb 60a to pivot as indicated by the broken lines and arrows of FIGURE 7 into the position shown.

Sleeve 42, supporting globe 20 is made readily replaceable by provision of an annular base 43 in which is mounted a spring biased, stud lock 44, as shown in FIGURE 8. When collar 42 is fully engaged on shaft 50, stud 44 fits within indent 52 located in the base of shaft 50 preventing the sleeve from moving longitudinally on shaft 50 but allowing rotation of sleeve 42 and globe 20.

One form of the apparatus for clamping the globe to a collar is described as follows:

A collar 32 is fixedly mounted on sleeve 42 by set screw 38 threadedly mounted in base flange 36. The globe 20 is provided with a hole 22 (shown in FIG. 5) to receive the collar 32. A pair of oppositely oriented, concave plastic washers 37 support the globe 20 and are held in position by a large diameter nut 34 threaded on the exterior threads of collar 32. Collar 32 may be positioned at any location along the longitudinal length of sleeve 42 but preferably the globe will be positioned so that light 60 is in the center of the globe. As indicated in FIG. 8, the globe and sleeve 42 are removed by withdrawing stud 44 in the direction of the arrow and vertically lifting the sleeve and globe so that the sleeve passes along the length of the shaft and around the plumb. The globe attachment apparatus as described facilitates rapid and easy replacement of a selected globe for another and allows free rotary movement of the mounted globe on the projector.

For special teaching purposes, the star map projection globe 20 may be replaced by any one of a group of globes which contain other selected information. For example, a globe having the numerous constellations shown thereon or a stellarium globe that projects over 1100 stars to those of 4.7 magnitude may be used. This projection simulates the real sky by obscuring the surface of the globe and simulates stars by projecting light through small holes in the globe. The choice of globes may include an Earth projection globe having a latitude and longitude grid for explaining map projections, time zones and to familiarize the student with the projection of the Earth into the sky. Additional celestial information can be placed upon a globe by means of a grease pencil.

A further unique construction of the projection globes is that shown in FIG. 9 which includes the star globe 20 shown and described in connection with FIGS. 1–2, and a smaller, Earth globe 100 mounted within and concentric to globe 20. The Earth globe may be rotated independently of the star globe to show, for example, geographic zenith positions of the stars. The supporting apparatus for the concentric globes is a modification of that disclosed previously and includes an inner globe locking apparatus 70 as well as an outer globe locking apparatus 80. The inner globe 100 is held by a pair of nuts 72 threaded on a collar 73 which is fixedy mounted by a set screw 73a on the sleeve 42a. Sleeve 42a is held by spring stud 44a on shaft 50 in the manner described in connection with FIG. 5. The outer globe locking apparatus 80 comprises a pair of plastic washers 82 held in position on collar 85 by nut 83 and flange 84. A pair of spacing rings 87 held by set screws 87a position collar 85 at the desired location along sleeve 42a but allow the collar to turn separately from sleeve 42a. By turning the knurled ring 43a, inner globe 100 will rotate with sleeve 42a and outer globe 20 may be restrained from movement by pressing one's hand on the surface. By rotating the globes relative to one another, the correct geographic zenith positions of the stars as of a certain time may be displayed or projected. Light 60 is positioned at the center of both globes and projects the outline of the Earth's continents and stars on the viewing surface for a variety of purposes, such as teaching navigation and the relationship of the stars to the Earth as of a certain time.

As an attachment to the basic apparatus, this invention further includes the planet display attachment shown in FIGS. 10 through 12.

In its preferred form, the planet display apparatus, generally indicated by the numeral 110 simulates the relative positions and motion of the planets relative to the sun, each other and the Earth. The apparatus 110 is preferably mounted within the star map projection globe shown in FIG. 1 and can be utilized in other ways. The apparatus is so supported that movement of the knurled ring 43a causes the apparatus to rotate around shaft 50 and the light 60.

Referring to FIG. 12 preliminarily, the detailed construction of the planet display attachment 110 includes a second sleeve 48 mounted on and concentric with first sleeve 42. Sleeve 48 supports a pair of collars 49 and 58 one above the other, collar 49 being fixedly mounted on sleeve 48 by set screw 49a and collar 58 mounted for free rotation on sleeve 48 and held against axial movement by collar 49 at the bottom and a pulley 115 at the top. Set screw 115a holds pulley 115 in place. Globe 20 is attached to collar 49 by threaded nut 59 and washers 59a.

Two parallel supporting arms 112 and 114 extend from collar 58 and sleeve 42, respectively, to support the display apparatus 110 and control movement of the various planet simulating spheres thereon. Arm 112, fixedly mounted on collar 58 by nut 58a and set screw 112a, supports a vertical bolt 120 threaded at the proximate end and having a pair of positioning nuts 121 and 123 threaded thereon. Sun simulating sphere 122 is mounted on the top of bolt 120 with the remaining spheres describing arcs therearound. In this form, bulb 60 simulates the position of the Earth and remains stationary while the sun sphere 122 and the other spheres rotate. A first sleeve 124 is mounted on bolt 120 and rotated by a belt 126 tracking within pulleys 125 and 115. Fixedly attached to the top of sleeve 124 is disc 130 mounting supporting wire 132 and the Mercury sphere 131.

A second concentric sleeve 135 is mounted for free movement on sleeve 124 and supports a top disc 136 upon which is mounted a wire 139 and a Venus sphere 138. A driving cable 141 tracks in a pulley 140 attached to the distal end of sleeve 135 and around sleeve 48.

A third concentric sleeve 144 is mounted for free movement on sleeve 135 and supports disc 150, wire 151 and the Mars sphere 152. Cable 148 rotates sleeve 144 through pulley 146.

The upper supporting arm 114 is fixedly mounted on sleeve 42 by set screw 114a and supports at its distal end a collar 114b which allows independent rotation of the sleeves as described hereinbelow but controls rotation of the sleeves around the axis of shaft 50.

The planet display apparatus 110 functions by simulating the Sun and the relative orbits of the four inner planets Mercury, Venus, the Earth and Mars. By positioning discs 130, 136 and 150, as shown in FIG. 11, and adjusting the length of the sphere supporting wires 132, 139 and 151, the relative orbits and orbital times of the planets can be effectively simulated.

Movement of each of the spheres is controlled by the knurled ring 43a which causes the upper supporting arm 114 to rotate thereby moving the apparatus 110 around the shaft 50. Lower arm 112 rotates freely with collar 58, as the driving cables 148, 141, and 126 tracking around sleeve 48 and pulley 115, the sleeves and discs, supporting the respective planet spheres are rotated independently at predetermined speeds. Of course, it is understood that equivalent drive means such as gearing can be substituted in the apparatus and that the sleeves and discs may be driven automatically by an electric motor as well as by hand.

The planet display apparatus can be viewed from outside of the encircling globe 20 seeing the relative positions of the planets and the sun. A viewer can also sight down the earth globe 20 and witness the relative positions of the planets to the Sun thereby visualizing eclipses of the planets and the Sun as would be seen by an observer on the Earth's surface.

The planet apparatus may also be used to project shadows of the planets when bulb 60 is illuminated. The student thereby sees the position of planets relative to the projected stars, constellations, etc. It should be understood that although the planet display apparatus has been described in particular detail, such detail describes only one form of the apparatus covered by this invention.

The invention disclosed hereinabove relates to a basic apparatus for mounting, displaying and projecting both terrestrial and celestial information in various forms from transparent globes, and includes attachments for simulating the position and movement of the moon as well as the other planets. Although this invention has been disclosed with reference to specific forms and embodiments thereof, it will be appreciated that a great number of variations may be made without departing from the spirit or scope of this invention. For example, parts may be reversed, equivalent elements may be substituted for those specifically disclosed, and certain features of the invention may be used independently of other features, all without departing from the spirit and scope of this invention as defined in the appended claims.

Having described by invention, I claim:

1. In an attachment interchangeable with other attachments for apparatus of the character described having a stem for receiving said attachments, the combination comprising a first sleeve adapted for being removably fitted over said stem and for being turned thereabout, a second sleeve turnably fitted over said first sleeve, an arm affixed to an upper end portion of said first sleeve and extending laterally therefrom, a second arm disposed in underlying spaced relation to said first arm and mounted upon said second sleeve for being turned freely thereabout, a bolt member affixed to a free end portion of said second arm and extending upwardly therefrom, a plurality of additional sleeves internested with said bolt member and extending therewith through the free end portion of said first arm, belt and pulley means interconnecting each of said additional sleeves with said second sleeve for turning each of said additional sleeves at a predetermined rate independently of the others when said first and second sleeves are turned about their central axis relative to each other, spherical members representing bodies of the universe operatively carried by said internested members, a transparent globe enveloping said attachment, and means affixing said globe to a lower end portion of said second sleeve, a lower end portion of said first sleeve being exposed for being gripped manually and turned for rotating said attachment about said stem independently of said globe.

2. The combination according to claim 1 wherein a lower end portion of the first sleeve is provided with a radially outwardly extending flange, and the second sleeve member is disposed between said flange and the first arm, being thereby secured against axial shifting movement relative to said first sleeve member.

3. The combination according to claim 1 wherein the means affixing the globe to the second sleeve includes a first collar fitted over and affixed to said second sleeve, the belt and pulley means includes a pulley fitted over and affixed to said second sleeve, and the means mounting the second arm upon the second sleeve includes a second collar fitted over said second sleeve and freely turnable thereabout, said second collar being disposed between said first collar and said pulley and thereby secured against axial shifting movement relative to said second sleeve.

4. The combination according to claim 1 wherein the belt and pulley means includes a pulley on each of the internested additional sleeves, a pulley on the second sleeve, a belt trained over the pulley on the second sleeve and over the pulley on the innermost one of the internested additional sleeves, and a belt trained over each of the other pulleys and directly around the second sleeve.

References Cited by the Examiner

UNITED STATES PATENTS

| | | | |
|---|---|---|---|
| 2,014,290 | 10/1935 | Pohlman | 35—46 |
| 2,098,296 | 11/1937 | LaGrasse | 35—45 |
| 2,477,027 | 7/1949 | Wenberg | 35—45.5 |
| 2,493,886 | 1/1950 | Lutolf | 35—46 X |
| 2,515,401 | 7/1950 | Dupler | 35—46 |
| 2,693,130 | 11/1954 | Green | 88—34 |
| 2,763,183 | 9/1956 | Liversidge | 35—47 |
| 2,985,969 | 5/1961 | Farquhar | 35—47 |
| 3,003,257 | 10/1961 | Madden | 34—43 |
| 3,029,528 | 4/1962 | Verson | 35—45 |

JEROME SCHNALL, *Primary Examiner.*